United States Patent [19]

Vysotsky et al.

[11] Patent Number: 5,832,063

[45] Date of Patent: *Nov. 3, 1998

[54] METHODS AND APPARATUS FOR PERFORMING SPEAKER INDEPENDENT RECOGNITION OF COMMANDS IN PARALLEL WITH SPEAKER DEPENDENT RECOGNITION OF NAMES, WORDS OR PHRASES

[75] Inventors: George J. Vysotsky, Riverdale, N.Y.; Ayman O. Asadi, Aliso Viejo, Calif.; David M. Lubensky, New Milford, Conn.; Vijay R. Raman, Greenwich, Conn.; Jayant M. Naik, Stamford, Conn.

[73] Assignee: Nynex Science & Technology, Inc., White Plains, N.Y.

[*] Notice: The term of this patent shall not extend beyond the expiration date of Pat. No. 5,719,921.

[21] Appl. No.: 904,920

[22] Filed: Aug. 1, 1997

Related U.S. Application Data

[63] Continuation of Ser. No. 609,029, Feb. 29, 1996, Pat. No. 5,719,921.

[51] Int. Cl.$^6$ .............................. G10L 9/08; H04M 1/30; H04M 1/66; H04M 3/42
[52] U.S. Cl. .......................... 379/88; 379/189; 379/199; 379/216; 379/361; 704/246; 704/275
[58] Field of Search ................................. 379/67, 88, 89, 379/79, 84, 188, 189, 199, 201, 216, 361; 704/246, 247, 275, 272, 201, 211, 270

[56] References Cited

U.S. PATENT DOCUMENTS

| | | | |
|---|---|---|---|
| 4,737,976 | 4/1988 | Borth et al. | 379/58 |
| 4,757,525 | 7/1988 | Matthews et al. | 379/89 |
| 4,827,500 | 5/1989 | Binkerd et al. | 379/88 |
| 4,853,953 | 8/1989 | Fujisaki | 379/88 |
| 4,864,622 | 9/1989 | Iida et al. | 381/41 |
| 4,908,864 | 3/1990 | Togawa et al. | 381/43 |
| 4,922,538 | 5/1990 | Tchorzewski | 381/42 |
| 4,928,302 | 5/1990 | Kaneuchi et al. | 379/88 |

(List continued on next page.)

OTHER PUBLICATIONS

*Voicedialing—The First Speech Recognition Based Telephone Service Delivered to Customer's Home*, G. Vysotsky, $2^{nd}$ IEEE Workshop on Interactive Voice Technology for Telecommunications Applications, Kyoto, Japan, Sep. 26–27, 1994.

(List continued on next page.)

*Primary Examiner*—Harry S. Hong
*Attorney, Agent, or Firm*—Michaelson & Wallace; Peter L. Michaelson; Michael P. Straub

[57] ABSTRACT

Methods and apparatus for activating telephone services in response to speech are described. A directory including names is maintained for each customer. A speaker dependent speech template and a telephone number for each name, is maintained as part of each customer's directory. Speaker independent speech templates are used for recognizing commands. The present invention has the advantage of permitting a customer to place a call by speaking a person's name which serves as a destination identifier without having to speak an additional command or steering word to place the call. This is achieved by treating the receipt of a spoken name in the absence of a command as an implicit command to place a call. Explicit speaker independent commands are used to invoke features or services other than call placement. Speaker independent and speaker dependent speech recognition are performed on a customer's speech in parallel. An arbiter is used to decide which function or service should be performed when an apparent conflict arises as a result of both the speaker dependent and speaker independent speech recognition step outputs. Stochastic grammars, word spotting and/or out-of-vocabulary rejection are used as part of the speech recognition process to provide a user friendly interface which permits the use of spontaneous speech. Voice verification is performed on a selective basis where security is of concern.

14 Claims, 5 Drawing Sheets

U.S. PATENT DOCUMENTS

| | | | |
|---|---|---|---|
| 4,945,557 | 7/1990 | Kaneuchi et al. | 379/67 |
| 4,961,212 | 10/1990 | Marui et al. | 379/67 |
| 4,979,206 | 12/1990 | Padden et al. | 379/67 |
| 5,007,081 | 4/1991 | Schmuckal et al. | 379/354 |
| 5,042,063 | 8/1991 | Sakanishi et al. | 379/88 |
| 5,054,053 | 10/1991 | Sakanishi et al. | 379/63 |
| 5,091,947 | 2/1992 | Ariyoshi et al. | 381/42 |
| 5,128,982 | 7/1992 | Dugdale et al. | 379/89 |
| 5,148,471 | 9/1992 | Metroka et al. | 379/58 |
| 5,150,399 | 9/1992 | Yasuda | 379/67 |
| 5,165,095 | 11/1992 | Borcherding | 379/88 |
| 5,181,237 | 1/1993 | Dowden et al. | 379/88 |
| 5,297,183 | 3/1994 | Bareis et al. | 379/59 |
| 5,315,649 | 5/1994 | Foster et al. | 379/355 |
| 5,319,703 | 6/1994 | Drory | 379/351 |
| 5,325,421 | 6/1994 | Hou et al. | 379/67 |
| 5,335,261 | 8/1994 | Fujinaka | 379/58 |
| 5,365,574 | 11/1994 | Hunt et al. | 379/88 |
| 5,369,685 | 11/1994 | Kero | 379/67 |
| 5,371,779 | 12/1994 | Kobayashi | 379/58 |
| 5,375,164 | 12/1994 | Jennings | 928/381 |
| 5,384,833 | 1/1995 | Cameron | 379/67 |
| 5,390,278 | 2/1995 | Gupta et al. | 395/2.52 |
| 5,404,422 | 4/1995 | Sakamoto et al. | 395/2.41 |
| 5,406,618 | 4/1995 | Knuth et al. | 379/67 |
| 5,420,912 | 5/1995 | Kopp et al. | 379/63 |
| 5,425,128 | 6/1995 | Morrison | 395/2.52 |
| 5,428,608 | 6/1995 | Freeman et al. | 370/60.1 |
| 5,452,289 | 9/1995 | Sharma et al. | 370/32.1 |
| 5,457,770 | 10/1995 | Miyazawa | 395/2.64 |
| 5,463,677 | 10/1995 | Bash | 379/88 |
| 5,463,685 | 10/1995 | Gaechter et al. | 379/207 |
| 5,463,715 | 10/1995 | Gagnon | 395/2.76 |
| 5,719,921 | 2/1998 | Vysotsky et al. | 379/88 |

OTHER PUBLICATIONS

*Connected Digit Recognition Using Connectionist Probability Estimators and Mixture–Gaussian Densities*, D. Lubensky, A. Asadi and J. Naikl, ICSLP–94, Yokohama, Japan, Sep. 18–22, 1994.

*Field Trial of Speaker Verification Service for Caller Identification in the Telephone Network*, J. Naik, $2^{nd}$ IEEE Workshop on Interactive Voice Technology for Telecommunications Applications, Kyoto, Japan, Sep. 26–27, 1994.

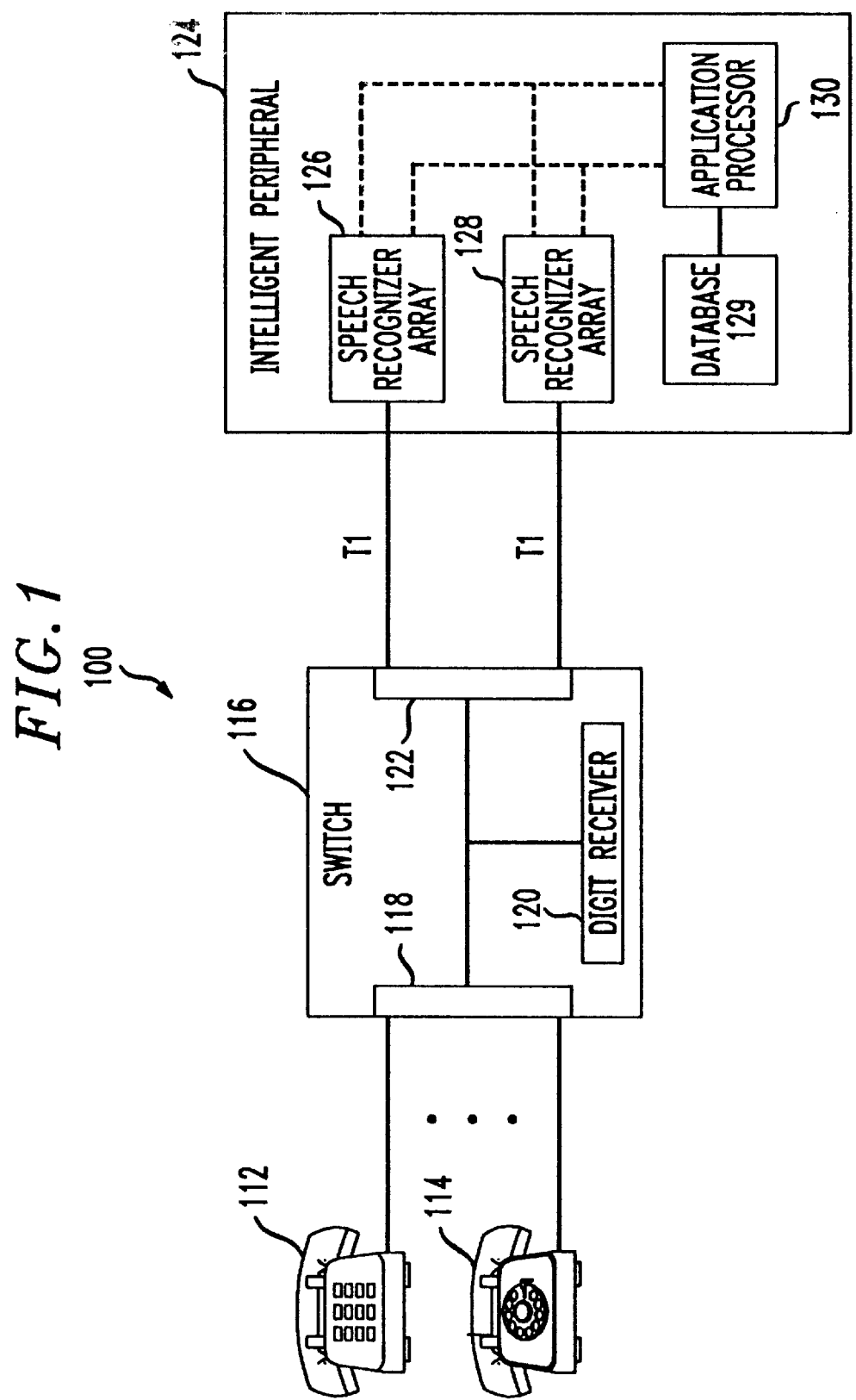

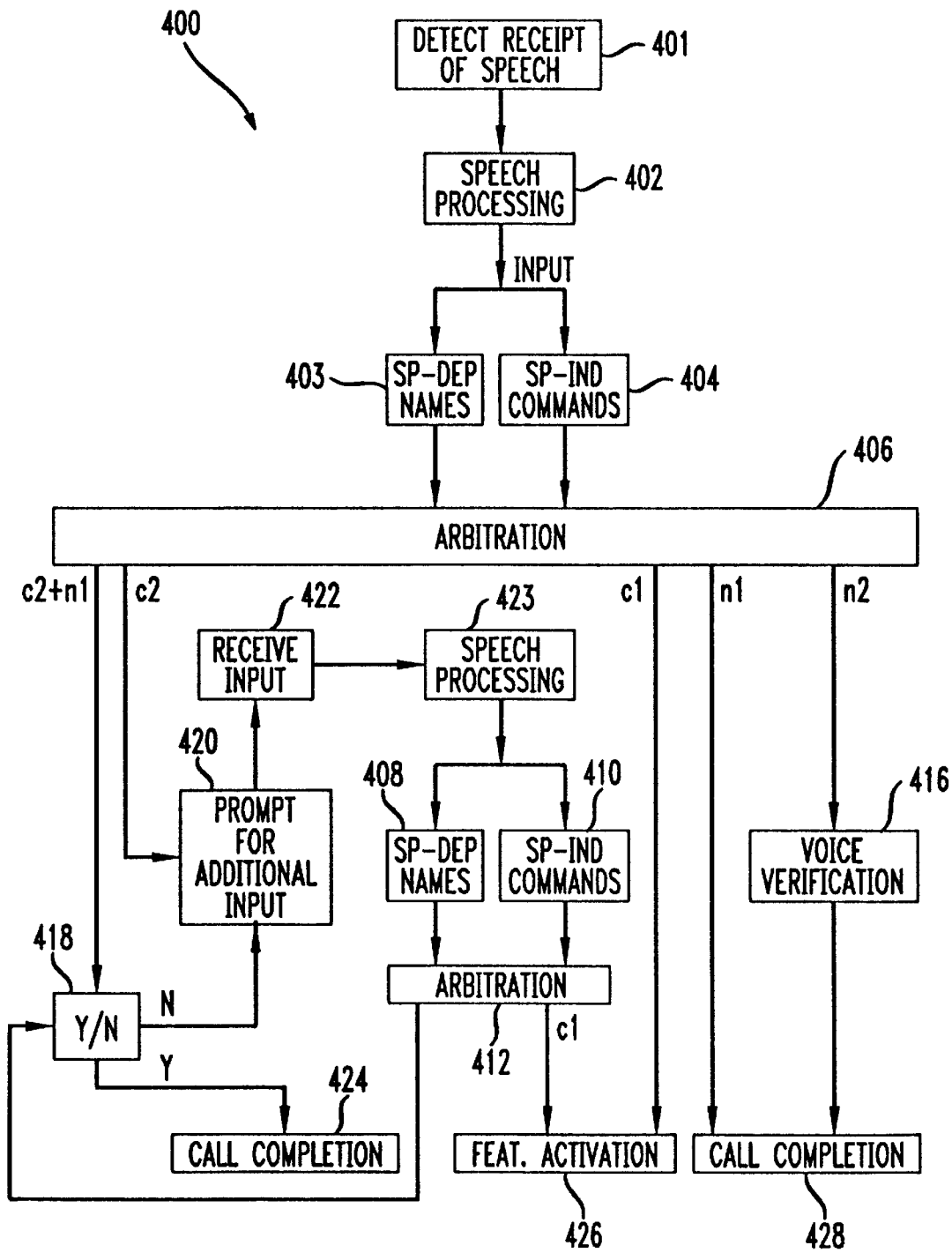

METHODS AND APPARATUS FOR PERFORMING SPEAKER INDEPENDENT RECOGNITION OF COMMANDS IN PARALLEL WITH SPEAKER DEPENDENT RECOGNITION OF NAMES, WORDS OR PHRASES

This application is a continuation of U.S. patent application Ser. No. 08/609,029 which was filed on Feb. 29, 1996 and issued as U.S. Pat. No. 5,719,921.

FIELD OF THE INVENTION

The present invention is directed to telephone systems and, more particularly, to methods and apparatus for activating telephone services in response to speech.

BACKGROUND OF THE INVENTION

Telephones are used to provide a host of services in addition to basic calling services. Such telephone services include services such as repeat dialing and call return where security is not of concern. Telephone services also include banking and financial services where security is of concern.

Voice controlled dialing systems such as the one described in U.S. Pat. No. 5,165,095 permit a user to place a call verbally without knowing the number of the person being called. In accordance with the known system a user first speaks a command, e.g., the word "call" followed by a destination identifier. Once the command is identified using speaker independent voice recognition techniques, the system accesses speaker dependent or independent templates to recognize the destination identifier. The recognized destination identifier associated with the person making the call is then used to access a data base associated with the caller and to obtain therefrom a telephone number.

The known system uses both speaker independent and speaker dependent speech recognition.

Speaker dependent speech recognition uses a computer that has been "trained" to respond to the manner in which a particular person speaks. In general, the training involves one person speaking a sound to generate an analog speech input, converting the speech input into signal data, generating a template representing the sound, and indexing the template to appropriate response data, such as a computer instruction to perform an action. During real time applications, input data is compared to the user's set of templates and the best match results in an appropriate response.

Speaker independent speech recognition uses a computer that stores a composite template or cluster of templates that represent the same sound spoken by a number of different persons. The templates are derived from numerous samples of signal data to represent a wide range of pronunciations.

The requirement for steering words in the known system preceding, e.g., a destination identifier such as a name, places constraints on a user in terms of how a user must format a spoken request to place a call. Such format constraints require a user to speak in a manner that may be unnatural or uncomfortable for a user.

In order to provide voice controlled telephone services in a more user friendly manner, it is desirable that the need for commands or "steering words" be eliminated for basic calling functions. In addition, it is desirable that a user be able to place calls without excessive artificial constraints being placed on the words or sequence of words required to, e.g., place a call.

In addition to placing calls, it is desirable that other telephone services, e.g., call forwarding, repeat dial, call return, etc. also be available to a user through the use of speech control. It is also desirable that telephone services, e.g., banking transactions, involving matters requiring various degrees of security, also be supported without the need for a user to supply security codes or other personal identification number (PIN) information.

SUMMARY OF THE PRESENT INVENTION

The present invention is directed to telephone systems and, more particularly, to methods and apparatus for activating telephone services in response to speech.

In accordance with the present invention a directory of names and telephone numbers is maintained for each customer. A speaker dependent speech template is created for each name as it is added by a customer to the customer's personal telephone directory. The speaker dependent templates are stored in a data base which can be downloaded when a customer initiates a telephone call.

The present invention permits a user, e.g., customer, to place telephone calls using speech as opposed to telephone numbers without the use of steering words, e.g., the command "call" being spoken before a destination identifier such as the name of an individual to be called. It accomplishes this by interpreting speech which matches a name in a customer's personal directory, absent an additional command, as being an attempt to initiate a call. Thus, upon detecting a match between a spoken name and a name in the customer's directory, the telephone number associated with the name in the customer's personal directory is dialed absent the receipt of an explicit command.

Identification of the customer for purposes of accessing the customer's personal telephone directory may be achieved using the telephone number of the telephone used to initiate the telephone transaction, by using a calling card number to initiate the telephone call or by a plurality of other known customer identification methods.

In addition to speaker dependent speech templates the present invention uses a plurality of speaker independent templates. The speaker independent templates are used to identify commands, e.g., REDIAL, CALL RETURN, etc., yes/no responses; and/or speaker independent names such as, e.g., home, which may be used by a plurality of customers.

In accordance with the present invention, speaker dependent speech recognition, e.g., to identify names in a customer's telephone directory, is performed in parallel with speaker independent speech recognition. The speaker independent recognition is used to detect, e.g., explicit commands.

After both speaker dependent and speaker independent speech recognition is performed on a received utterance which may be a word, e.g., the name John, or a phrase, e.g., Call forwarding to Mary, the results of the speech recognition steps are analyzed. In the event that only a speaker dependent name is recognized, a call is placed to the phone number associated with the recognized name in the customer's personal directory. In this manner, a customer can place a call by simply speaking a name. Placing a call in this manner may be thought of as issuing an "implicit command" to dial since the system of the present invention will interpret a speaker dependent name, in the absence of other commands, as a command to dial the number associated with the name.

When a speaker independent command is detected, and no speaker independent name has been detected, the command is performed unless additional input is required, e.g., a name in the case of call forwarding, or security is of concern, such as in the case of message retrieval where the phone company is providing voice mail services. When security is of concern, a voice verification step is performed and the customer's identity is verified. Accordingly, the present invention provides a flexible system where voice verification is performed on an as needed basis and not necessarily on all calls.

The system and method of the present invention supports commands which require additional inputs of either a name or another command. When such commands are detected by the speaker independent recognition step, a check is made to determine if the additional information was received as part of the same utterance in which the command was received. If it was, the command is processed accordingly. Otherwise, the needed additional input is requested and processed using speaker dependent and speaker independent speech recognition in parallel as described above.

Since both speaker dependent and speaker independent speech recognition is performed in parallel, both speech recognition steps may produce possibly valid recognition results which would result in a conflicting interpretation of the command or action to be performed. To resolve any disputes between the outcomes of the speech recognition steps, an arbiter is used to analyze the results and determine which course of action, e.g., command, is most likely the correct one. The course of action that is selected by the arbiter that will be followed in the case of potentially conflicting speech recognition results.

In order to assist the arbiter in determining which speech recognition result is mostly likely correct, in one embodiment of the present invention, the speech recognition steps produce a confidence value whenever they recognize a name or command. The confidence values associated with the outputs of the speaker dependent and speaker independent speech recognition steps are used together with additional information such as durational models of each word and the statistical probability of each name or command being received.

Accordingly, the method and apparatus of the present invention permits a user to place a call by speaking a name without the need to first speak a steering word. The present invention also provides for call security via the selective application of voice verification in telephone transactions where security is of concern.

The use of stochastic grammars, word spotting and out of vocabulary word rejection features permit a customer to place a call or control the use of telephone services using language that is much closer to natural speech than is possible with other less flexible systems. For example, in accordance with the present invention the instruction <Call forwarding to Mary> can also be spoken as <Uhm . . . please . . . , I would like to activate call forwarding to . . . uhm . . . Mary, if I may>.

In addition to the above described features, many other features and embodiments of the present invention are described in detail below.

BRIEF DESCRIPTION OF THE DRAWINGS

FIG. 1 is a block diagram of a telephone system implemented in accordance with one embodiment of the present invention.

FIG. 4 is a flow chart illustrating operation of the telephone system of FIG. 1 as speech is received and processed.

DETAILED DESCRIPTION

Figure 2A:
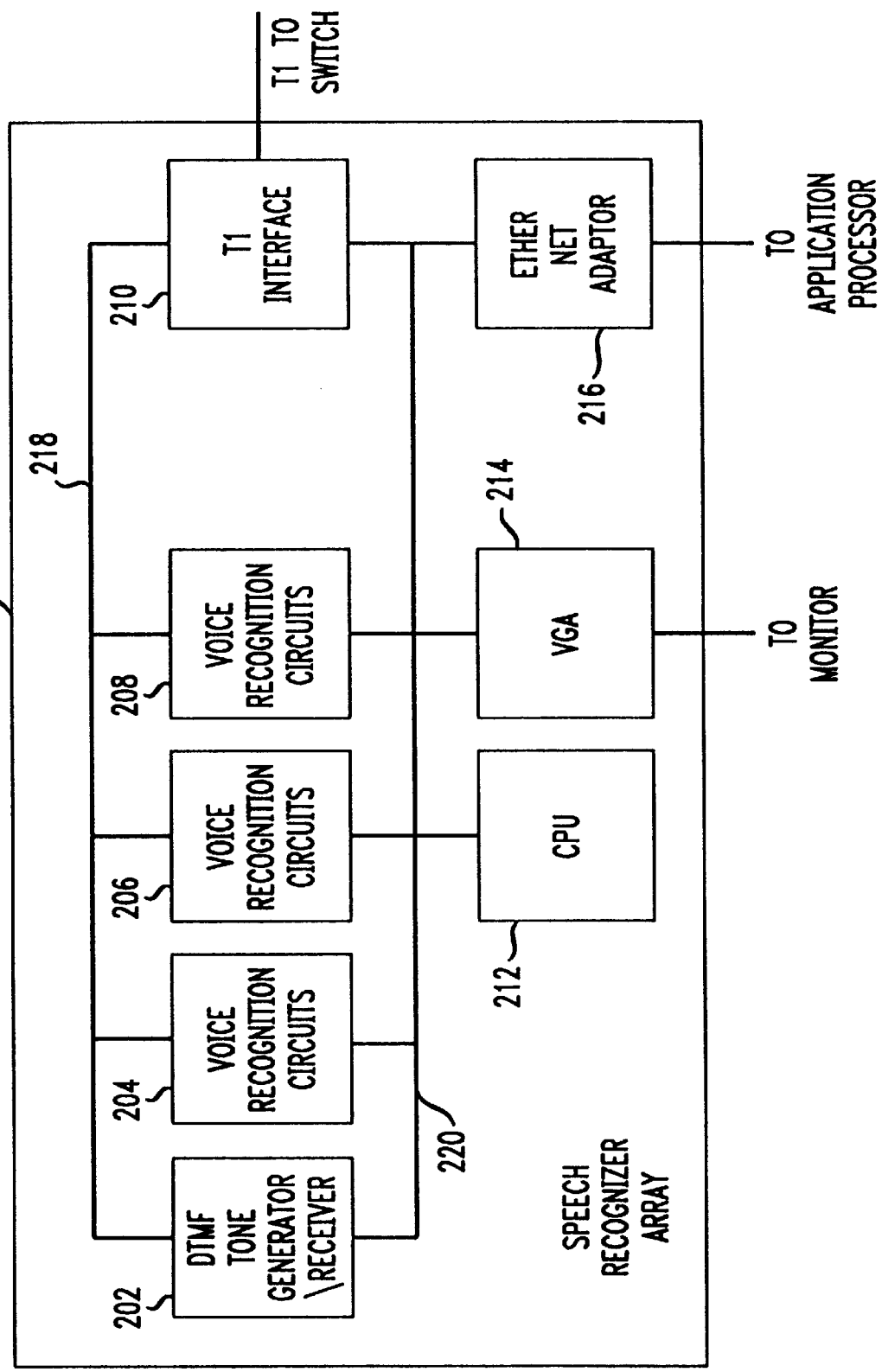
FIG. 2A is a block diagram of a speech recognizer array implemented in accordance with one embodiment of the present invention.

As discussed above, the present invention relates to methods and apparatus for providing voice controlled telephone services. FIG. 1 illustrates a telephone system 100 which provides speech controlled telephone services in accordance with one embodiment of the present invention. The telephone system 100 comprises a plurality of telephones 112, 114 which are coupled to a switch 116. The switch 116 includes a telephone interface 118, a digit receiver 120 and a T1 interface 122. The telephone interface 118 is used to couple the telephones 112, 114 to the digit receiver 120 and the T1 interface 122.

The digit receiver 120 monitors signals received via the interface 118 and/or T1 interface 122 to detect DTMF tones representing a destination telephone number. Upon detecting DTMF tones representing a destination telephone number, the digit receiver 120 routes the call in response to the DTMF tones, to the destination represented by the DTMF tones. The call is routed via, e.g., a telephone network coupled to the switch 116.

The T1 interface 122 is coupled to an intelligent peripheral 124 via first and second T1 links. As is known in the art, each T1 link is capable of handling 24 separate voice channels.

The intelligent peripheral 124 is used to control the switch 116, e.g., to place a call in response to speech. Communication of switch control information between the intelligent peripheral 124 and the switch 116 is conducted in accordance with a method described in U.S. patent application Ser. No. 08/267,792 filed Jun. 28, 1994 which is hereby expressly incorporated by reference.

The intelligent peripheral 124 includes first and second speech recognizer arrays 126, 128, an application processor 130, and a database 129. The first and second speech recognizer arrays 126, 128 are coupled to the first and second T1 links, respectively, and to the application processor 130. The application processor 130, in turn, is coupled to a database 129, which includes, e.g., a customer list, a set of user dependent speech templates for each customer, a list of telephone numbers, and other information. While the intelligent peripheral 124, for exemplary purposes, is illustrated as including two speech recognizer arrays 126, 128 is to be understood that it may include any number of such arrays.

In accordance with one embodiment of the present invention, for each destination identifier for which a speech template is stored in the database 129, there is also stored a recording of the destination identifier and a telephone number associated with the destination identifier. The recording is used as part of a confirmation message played back to the customer after a match with a template is detected. The telephone number is used to place the call.

Referring now to FIG. 2A, there is illustrated an exemplary speech recognizer array 200 which may be used as the first and second speech recognizer arrays 126, 128.

The speech recognizer array comprises a T1 interface 210, first through third voice recognition circuits 204, 206, 208, a DTMF tone generator/receiver circuit 202, a central processing unit 212, a VGA graphics card 214 which is coupled to a monitor, and an Ethernet adapter 216. The Ethernet adapter 216 is used to couple the speech recognizer array 200 to the application processor 130.

The T1 interface card 210 is coupled to the T1 link and is responsible for supplying voice channels to the voice recognition circuits 204, 206, 208 and the DTMF tone generator circuit 202 via a first data bus 218, e.g., a MITEL ST-Bus™ bus. A second bus 220, which is a host computer bus, e.g., an AT-bus is coupled to the T1 interface, first through third voice recognition circuits 204, 206, 208, DTMF generator 202, CPU 212, graphics card 214 and Ethernet adapter 216.

The T1 interface 210 routes each of the 24 voice channels of the T1 link to one of the three voice recognition circuits 204, 206, 208. In the illustrated embodiment, each voice recognition card 204, 206, 208 handles 8 voice channels. The DTMF tone generator/receiver 202 is responsible for generating the DTMF tones required to place a call and for detecting DTMF tones, e.g., *99, representing a specific mode of operation, e.g., directory mode. The CPU 212 is responsible for controlling the operation of the various components of the speech recognizer array and the transfer of data to and from the application processor 130 via the Ethernet adapter 216. Operation of the voice recognition circuits 204, 206, 208 will be discussed in detail below.

Figure 2B:
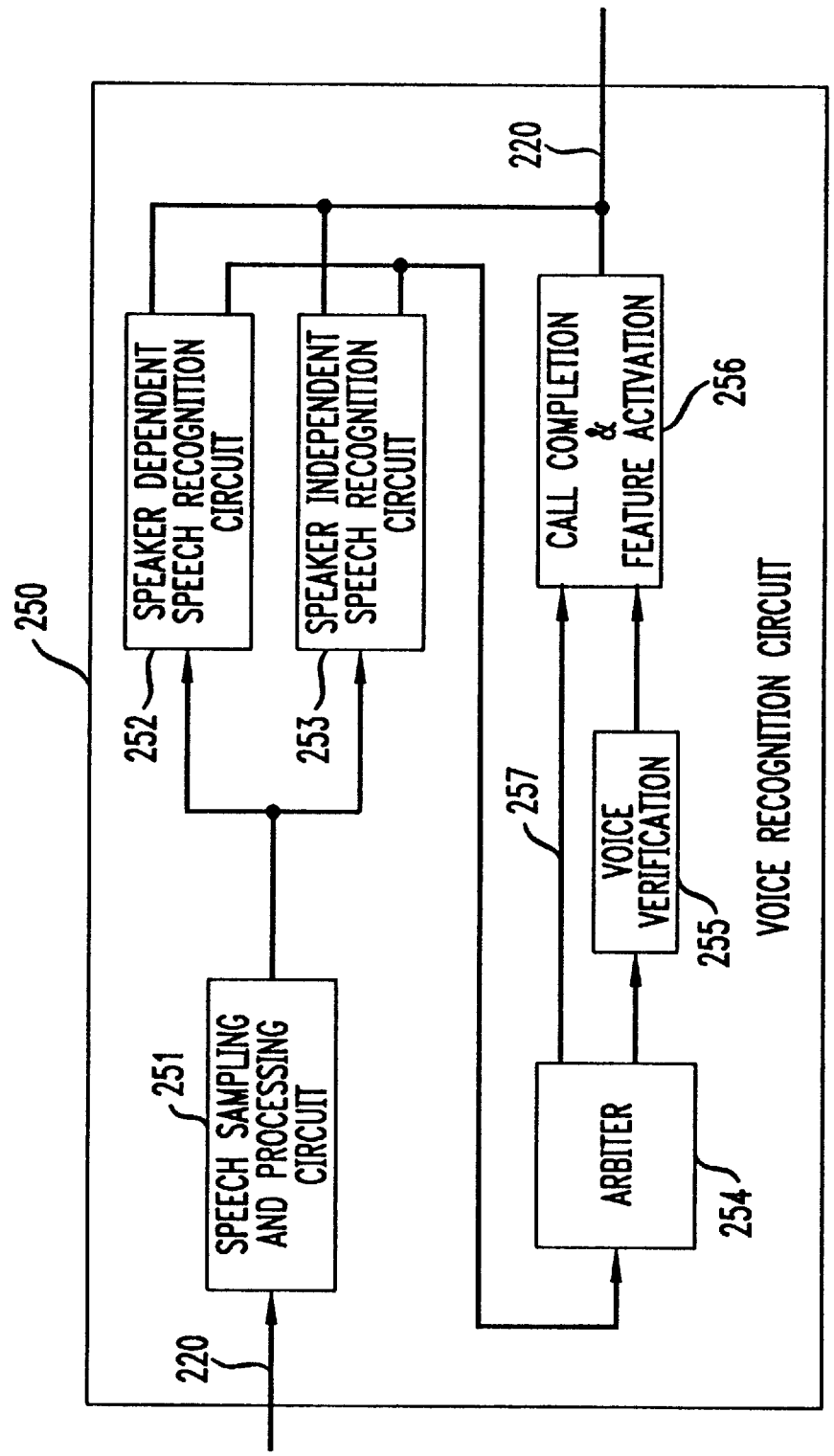
FIG. 2B is a block diagram of a voice recognition circuit suitable for use in the speech recognizer array illustrated in FIG. 2A.

A voice recognition circuit 250 suitable for use as one of the voice recognition circuits of FIG. 2A, is illustrated in FIG. 2B. The voice recognition circuit 250 comprises a speech sampling and processing circuit 251 which is coupled to the voice bus 220 for receiving speech therefrom. The output of the speech sampling and processing circuit 251 is coupled to the inputs of a speaker dependent speech recognition circuit 252 and a speaker independent speech recognition circuit 253. The speech recognition circuits 252, 253 are coupled to the data bus 220. via the data bus 220 speech recognition templates can be transferred between the data base 129 and the speech recognition circuits 252, 253 through the use of the application processor 130. The outputs of the speaker dependent and speaker independent speech recognition circuits 252, 253 are coupled to an arbiter 254.

The arbiter 254, in turn, is coupled to a call completion and feature activation circuit 256 by a line 257 and by a voice verification circuit 255. Using this arrangement, voice verification is performed selectively when, for security purposes, it is important to verify the identity of a caller before responding to a particular command.

The voice recognition circuit 250 may include additional feedback loops and circuits for requesting additional information from a caller as may be required depending on a particular application.

Figure 3:
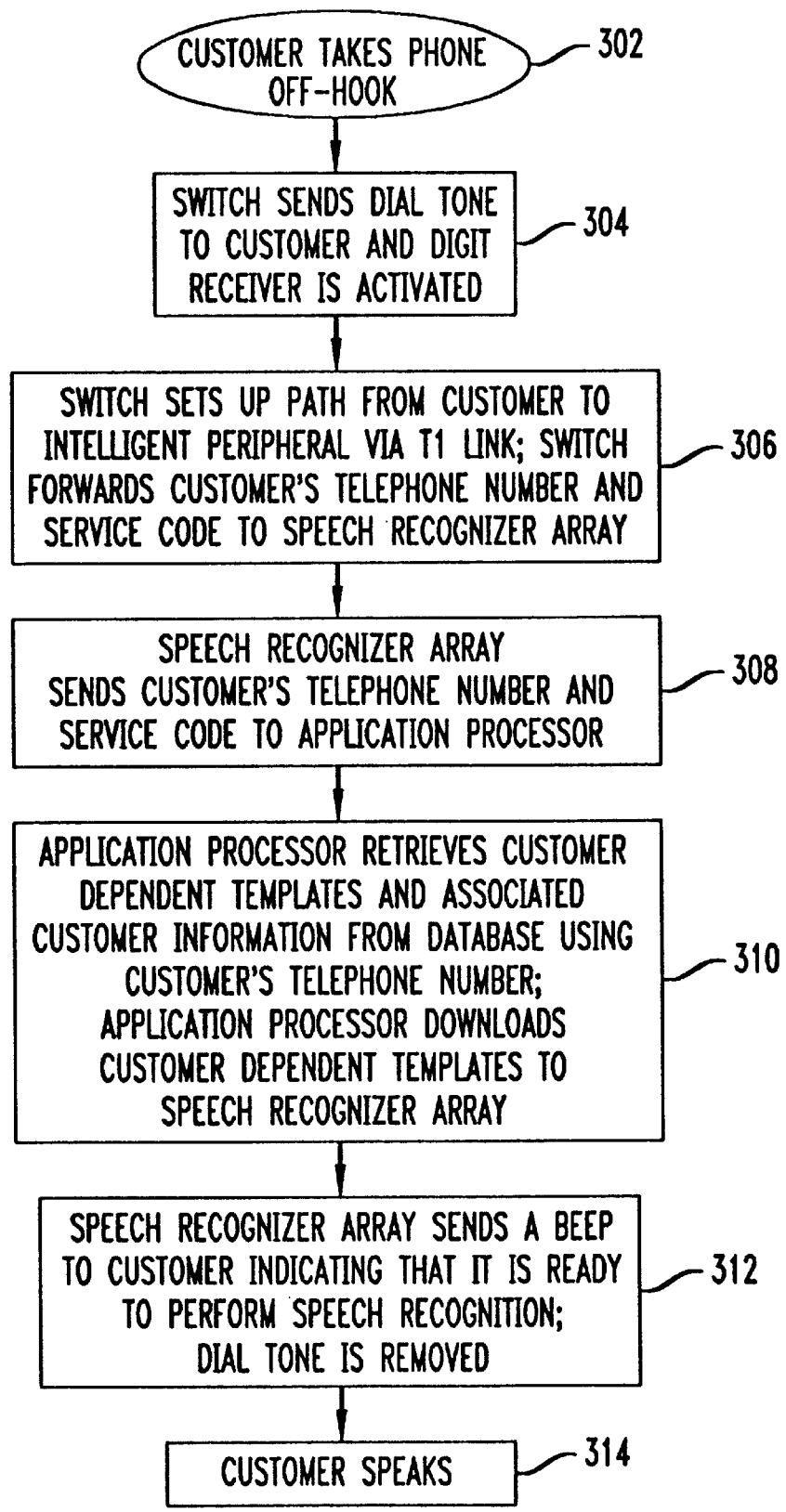
FIG. 3 is a flow chart illustrating operation of the telephone system of FIG. 1 from the time a customer takes a phone off-hook to the time the customer speaks.

Referring now to FIG. 3, the operation of the telephone system 100 will be described from the time a customer take a phone 112, 114 off-hook until the point where the customer speaks. As illustrated in FIG. 3, telephone system interaction with a customer begins when the customer takes the phone off-hook as represented by block 302. After the phone is taken off-hook system operation progresses to step 304. At this point, the switch 116 sends a dial tone to the customer and the digit receiver 120 is activated.

In the next step, step 306, the switch 116 sets up a path from the customer to the intelligent peripheral 124 via either of the first or second T1 links. Once the path between the switch 116 and intelligent peripheral 124 is established, the switch 116 forwards customer identification information, e.g., the customer's telephone number, and a service code to one of the speech recognizer arrays, e.g., the speech recognizer array 126.

Operation then proceeds to step 308. In step 308, the speech recognizer array 126 sends the customer's telephone number and service code to the application processor. The application processor 130, in step 310, retrieves customer dependent speech templates and associated customer information from the database 129 using, e.g., the customer's telephone number as an index to the database 129. The application processor 130 downloads the retrieved customer dependent speech templates to the speech recognizer array 126. Other customer information, e.g., the types of or level of service to which the customer subscribes and the status of the customer's account, e.g., active or inactive, may be retrieved and downloaded as well.

Upon receiving the speaker dependent templates from the application processor 130, the speech recognizer array 126, in step 312, signals its readiness to perform speech recognition by removing the dial tone and sending a beep to the customer.

It should be noted that speaker independent templates, for, e.g., explicit commands, may be stored locally in the speech recognizer array 126 or downloaded from, e.g., the database 129. In as much as speaker independent templates are non-speaker dependent, there is no need to download a separate set of speaker independent templates for each individual customer.

Upon receiving the beep, the customer is expected to speak in order to, e.g., place a call. The customer's speaking is represented by step 314. The speech is conveyed to the speech recognizer 126 via the switch 116 and a T1 link.

Operation of the telephone system 100 will now be described with reference to FIG. 4 which illustrates the method of the present invention for processing speech and performing operations in response thereto. The flow chart 400 of FIG. 4 comprises a series of function blocks or steps performed in accordance with the present invention.

The method the present invention, represented by the steps of FIG. 4, combines several speech recognition and speaker verification steps. The method of the present invention allows customers to pick up the phone and say a name, e.g., "John", to call John, or pick up the phone and say a command or function such as "Call return", to activate or have the desired service or function performed.

Examples of implicit and explicit commands which may be used to invoke or cancel various functions and/or services, in accordance with one embodiment of the present invention, are listed below. Each possible command is listed on a separate line. Various ways of invoking the same function or service using one or more different commands are listed on the same line. At the end of each line, in parenthesis, is a type identifier that is used to identify the command type.

| | | |
|---|---|---|
| SD NAME, e.g. "John" | | (n1) |
| REPEAT DIALING; | REDIAL | (c1) |
| CALL RETURN; | RETURN CALL | (c1) |
| CALL TRACE; | TRACE CALL | (c1) |
| CALL FORWARDING; | FORWARDING (MY) CALLS | (c2) |
| VOICE DIALING | | (n2) |
| MESSAGES; | VOICE MESSAGES | (n2) |
| CALL ANSWERING | | (n2) |
| CANCEL REDIAL; | CANCEL REPEAT DIALING | (c1) |

-continued

| | | |
|---|---|---|
| CANCEL CALL FORWARDING | | (c1) |
| CANCEL CALL RETURN; | CANCEL RETURN CALL | (c1) |
| REVIEW | | (c1) |
| PHONE | | (c1) | where: VOICE DIALING is an explicit command used to enter a directory mode of operation during which a customer may make modifications to the customer's personal voice dialing directory.

The command type identifiers are as follows:

n1—speaker dependent name or command
n2—speaker independent name or command
c1—type 1 command
c2—type 2 command which requires further input of a name or command As will be discussed below, a distinctive feature of the present invention is that speaker independent speech recognition of commands are performed in parallel with speaker dependent recognition of names from the individual customer's personal telephone directory. This results in two different speech recognition processes being performed on the same speech simultaneously. In such an embodiment, a customer may say an utterance from either of the two vocabularies without explicitly indicating which vocabulary is being used. Performing both speaker dependent and speaker independent speech recognition in parallel eliminates the need to use of an explicit command or steering word as required in the prior art systems, to place a call.

Referring now to the flow chart 400 of FIG. 4, it can be seen that in accordance with the present invention, speech processing begins in step 401 with the detection of the receipt of speech by, e.g., the voice recognition circuit 204. In step 402, the received speech is processed prior to performing speech, recognition thereon.

In the exemplary embodiment, in step 402, the received speech, which was previously sampled at, e.g., 8 KHz by the switch 116, is divided into frames every 20 ms with a window of 30 ms. 10 LPC-based cepstra, 10 delta cepstra, energy, and delta-energy are computed for every frame. The delta-cepstra are computed with a standard interpolation formula over a 5 frame window. In the exemplary embodiment, all speech features are quantized to 8 bits.

After speech processing is performed, speaker dependent speech recognition is performed in step 403. In parallel, e.g., at the same time, speaker independent speech recognition is also performed in step 404.

In the exemplary embodiment, both speaker dependent and speaker independent speech recognition are performed as is known in the art, using continuous density hidden Markov models. Speech recognition may be performed as described in the article by D. Lubensky, A. Asadi, and J. Naik, "Connected Digit Recognition Using Connectionist Probability Estimators and Mixture-Gaussian Densities", ICSLP-94, Yokohama, Japan, 1994, which is hereby expressly incorporated by reference. In the exemplary embodiment of the present invention, recognition is based on whole word models. However, it is also possible to perform speech recognition using any level of sub-word models as well.

As is known in the art prior to performing speech recognition, training is used to create speaker independent as well as speaker dependent word models.

The training required to build the speaker independent word models, i.e., templates, is accomplished in two steps. The first step computes a forced path alignment of training utterances. The training utterances may be, e.g., the commands set forth in the above table spoken by a plurality of individuals. In the second step, the mixtures of each state, where 4 mixtures per state are used, are updated from the alignments and a diagonal covariance matrix is computed for each mixture. The system uses speech data collected over a telephone network to train the word models, a 3-state silence model, and an 8 state out of vocabulary (OOV) model which is sometimes referred to as a garbage model. The OOV model is trained on a large amount of telephone speech that does not include the target vocabulary words.

The speaker independent recognition process is implemented using stochastic grammar built from target words, OOV words, and silence. The stochastic grammar is used to determine which word sequences are allowed. During speech recognition, a Viterbi search with pruning is performed to find the most likely word sequence. During the search, the distance between the features of the frames and the Gaussian mixtures of the states is computed and used to produce a confidence measure which indicates the likelihood that a match between one of templates representing a modeled command, function or service was successfully found.

The speaker dependent speech recognition process represented by step 403, involves identifying spoken names which correspond to names represented by templates in the customer's personal calling directory. The speaker dependent templates which were previously downloaded from the database 129 are used for this purpose.

The speaker dependent speech recognition process, like the speaker independent speech recognition process, is based on hidden Markov models (HM) with the use of grammars. It also uses word spotting and out of vocabulary rejection in a completely configurable form.

A customer may add names or delete names from a speaker dependent directory by using explicit directory maintenance commands and menus to create and delete templates and records as desired.

In order to build HMM speaker dependent name models referred to as templates, in one embodiment, a single Gaussian mixture is used, with pooled covariance, and on-line mean estimation. The models are implemented from left to right, with no skips. The speaker dependent speech recognition process uses the same Viterbi search algorithm used for speaker independent speech recognition but with Euclidean distance as a metrics. The number of states per HMM model is quantized to 3 levels with, in one embodiment, the maximum number of states allowed being 20.

During speaker dependent speech recognition, speaker dependent garbage models are used for out of vocabulary rejection as well as word spotting. These garbage models are built on-line and, in the exemplary embodiment, modified every time the user's directory of names is changed e.g., during a directory maintenance mode of operation. Four garbage models are used in the exemplary embodiment. Three have numbers of states corresponding to the three durational values of the name models. The fourth one is a single state model. In addition, three single-state background, e.g., silence, models, tuned for different background conditions, are used. The grammar is shared by both the speech recognition and training process used to generate the templates used for speech recognition. The grammar can be modified by adjusting path probabilities to achieve various levels of word spotting and rejection.

In accordance with an exemplary embodiment of the present invention, when a user is in a directory maintenance mode of operation and a speaker dependent model for a name to be added to the customer's directory is being generated, two repetitions of the name spoken by the customer are required. The system of the present invention seeks a consistent pair of utterances before building a model, and additionally determines if the name is too similar to another name in the customer's directory to reduce the risk that the name will be miss-recognized due to the use of multiple similar names. In order to achieve this, a recognition pass is performed during the training process to asses the system's ability to properly detect the name being added to the directory.

The result of the speaker dependent speech recognition step 403 and speaker independent speech recognition step 404 is a sentence which comprises one or more descriptive strings, e.g., of a name, command, or both. Both speech recognition steps also produce time alignment information relating to the recognized words if the words are spoken in a sentence. This time alignment information is used to determine, in some cases, if arbitration is required. For example, if a name and a command are detected and the time alignment information indicates that they were spoken during the same time interval, as opposed to different time intervals, only the output of one of the speech recognition steps 403, 404 can be correct. In such a case, arbitration is used to decide which output should be used.

A confidence measure which indicates the likelihood that the results represent the correct identification of a word, name, command or other utterance is also produced as part of the speech recognition steps 403, 404. The confidence3 measures thus produced are used to ascertain which speech recognition step most likely produced the correct result when both recognition steps 403, 404 recognize, e.g., one or more words, names, or commands.

The outputs of both the speaker dependent and speaker independent speech recognition steps 403, 404 are supplied to the input of an arbitration step 406. The arbitration step 406 is used to arbitrate between the results of the two speech recognition steps 403, 404 in the event that the both detect a successful match, e.g., corresponding to speech which occurred in the same time interval.

The level of successful speech recognition depends on the ability of both the speaker dependent speech recognition (SDR) and speaker independent speech recognition (SIR) steps 403, 404 to effectively reject out of vocabulary (OOV) inputs thereby reducing or eliminating the need for arbitration to determine which output should be accepted as the correct one. For example, consider the following three possible outcomes:

| SDR | SIR | RESULT |
|-----|-----|--------|
| name | oov | name |
| oov | command | command |
| name | command | ? |

In the case of the first two outcomes, no arbitration is required since only one of the speech recognition steps found a match. However, in the third case, where both the SDR and SIR steps 403, 404 produce possible matches, arbitration is required to differentiate and select between the results.

In one test, 5.8% of all inputs required arbitration when inputs were names and 7.3% when the inputs were commands. These figures will vary depending on, e.g., particular word vocabularies. In the test, the difference in the need for arbitration was due, at least in part, to the fact that the name vocabularies used mostly comprised short first names, which are more frequently falsely detected using word spotting then are lengthier commands.

The confidence measures produced by the two speech recognition steps 403, 404 could be used as the sole basis for arbitrating between the results of the speech recognition processes with the output of the speech recognition process which produces the higher confidence measure being selected.

However, more sophisticated arbitration schemes may also be employed. Such schemes may use additional information derived from durational modeling of words in the vocabulary as well as the statistic based probability of the occurrence of each command. It is expected that names will be received much more frequently than commands since, at the present time, people tend to primarily use telephones to place calls as opposed to e.g., request services such as call return.

In the exemplary embodiment, the arbitration scheme is implemented as a function of: 1) the recognition confidence measure produced by the SDR and SIR steps 403, 404 and 2) durational models of each word of a command and each name built during training.

While the above arbitration approach is used to select between the outputs of the SDR and SIR steps 403, 404, for most commands, in the case of type c2 commands where the grammar allows a speaker independent command and speaker dependent name to be spoken in one phrase, additional analysis may be used as part of the arbitration process. In such a case, score thresholding, duration checks, and/or scanning of time alignment can also used as the part of the arbitration process to assist in distinguishing between the receipt of C2 commands and merely the receipt of a name intended to be used to place a call.

After the arbitration step is completed, the method of the present invention progress to the next level in the process illustrated in FIG. 4. The particular step, 418, 407, 416 to which the process proceeds depends on the type of name, command or combination thereof that was detected.

The branch cl2+n1 in FIG. 4 represents progression from the arbitration step to a confirmation step 418. The C2+n1 path is followed in the event that a c2 type is command and a speaker dependent name are detected together, e.g., when the customer says "FORWARD (MY) CALLS (TO) JOHN", where the words in parenthesis are not required but will not interfere with proper detection of the command and name because of the use of word spotting techniques and/or OOV rejection.

In step 418, the customer is played a confirmation message, e.g., "Do you wish to forward your calls to John?" where the name John is generated by playing back the recording of the name associated in the database 129 with the template that was used to identify the name John in the received speech. A verbal yes/no response is expected. In the event that a "yes" response is detected, e.g., using speaker independent speech recognition, the method progresses to step 424 and the call is completed with the customers calls being forwarded to the telephone number in the database 129 associated with the customer's template for the name John.

If however, a "no" response is detected in step 418 or no "yes" response is detected within a preselected period of time, the process progresses from step 418 to step 420 in which the customer is prompted for additional input, e.g., the name of the person to whom calls are to be forwarded when step 420 is being performed subsequent to step 418.

If, at step 406, it is determined that a c2 type command, e.g., a call forwarding command, has been received without the additional input of a name or command required, the process proceeds from step 406 to step 420 where the customer is prompted for the additional input required.

From step 420, the process proceeds to step 422 where the additional speech input is received and then step 423 where it is processed prior to performing speech recognition thereon.

SDR and SIR are performed on the processed speech in parallel in steps 408 and 410 in an attempt to detect a name in the customer's personal directory or a command. Arbitration step 412 is used to select between the results of the SDR and SIR in the event that both steps 408, 410 result in detecting a possible valid input, e.g., a name or command. In the event that the arbitration step 412 determines that a speaker dependent name was received path n1 is taken from step to the confirmation step 418 where confirmation of the command, e.g., call forwarding, and destination, e.g., name, is requested prior to call completion.

If, in arbitration step 406, it is determined that a type c1 command has been received, e.g., a REPEAT DIALING, CALL RETURN, CANCEL REPEAT DIALING, CANCEL CALL RETURN, or REVIEW command, the process proceeds directly from the arbitration step 406 to feature activation step 426 where the operation associated with the command is performed.

If in arbitration step 406, it is determined that a type n1 phrase, e.g., a speaker dependent name has been received, and a type c2 command has not been received, the process proceeds from the arbitration step 406 to a call completion step 428. In the call completion step, the destination telephone number associated with the speaker dependent name that was detected is dialed and the recording of the name stored in the database 129 is played back to the customer as a confirmation message.

If in arbitration step 406, it is determined that a type n2 phrase has been detected, e.g., a speaker independent command such as a banking transaction command or a message retrieval command, the process proceeds to step 416 in which voice verification is performed. Various levels of voice verification may be used depending on the particular function being requested. For example, when a customer is seeking to perform a banking transaction, a higher degree of voice verification may be performed as compared to when a customer is merely seeking to receive voice messages.

The voice verification performed in step 416 may use any one of a plurality of known voice verification methods. In one exemplary embodiment the voice verification process uses a fixed text protocol and a voice password which is a digit string of 7–10 digits. The enrollment of the voice password is mediated by fixed grammar and speaker independent digit recognition which assures reliable word segmentation. Speaker specific voice verification models are generated at the time a customer's phone directory is initially created using the speech segmentation process described above.

The voice verification step includes speech sampling and processing that is the same as or similar to that performed in step 402 and may include the use of a spoken password. In the exemplary embodiment, voice feature vectors are transformed using discriminate training and principal component analysis in an attempt to produce the maximal separation between known true-speaker and impostor data distributions.

If the voice verification is successful in step 416 and the speaker's identity is thus confirmed, the speaker's reference model is updated to thereby adapt the customer's reference model to incremental changes in the speaker and the channel coupling the customer to the speech recognition array 126. Acceptance decision criteria may also be adapted to individual customers over time to improve the likelihood of a high true user acceptance rate while maintaining a high impostor rejection rate.

If the customer's identification is confirmed in the voice verification step 416, the process progresses to the call completion step 428 and the requested action, e.g., the stored messages are played. If however, the voice verification step 416 indicates that an impostor is attempting to place a call, the call is terminated or other appropriate action is taken.

In accordance with the present invention, the voice verification step 416 is invoked selectively, i.e., only when security or the caller's identity is of concern. Such an unobtrusive approach to providing security to telephone transactions may be used in any number of practical applications. For example, in a telephone banking application, some information can be provided to anybody, e.g., a bank may use a speech recognition system to respond to an inquiry Can I get your mortgage rates? without any security concerns. However, in the case of a telephone inquiry May I have my account balance? security is of concern and voice verification offers a method of providing the required security.

What is claimed is:

1. A method of providing a service in response to speech, comprising the steps of:
   identifying the speaker;
   performing in parallel,
   i. a speaker independent speech recognition operation to identify a spoken command;
   ii. a speaker dependent speech recognition operation in an attempt to identify a word; and performing an operation in response to the spoken command identified by performing the speaker independent speech recognition operation.

2. The method of claim 1,
   wherein the spoken command is a command to dial a telephone number; and
   wherein the step of performing an operation includes the step of:
   dialing a telephone number associated with a word detected by performing the speaker dependent speech recognition operation.

3. The method of claim 2, wherein the word is a name, the method further comprising the steps of:
   retrieving from a database, a plurality of speaker dependent speech templates associated with the identified speaker to be used when performing the speaker dependent speech recognition operation; and
   retrieving from a data base, a telephone number associated with the name identified by performing the speaker dependent speech recognition operation.

4. The method of claim 2, further comprising the step of:
   retrieving from a database, a plurality of speaker dependent speech templates associated with the identified speaker, to be used when performing the speaker dependent speech recognition operation.

5. The method of claim 2, further comprising the step of:
   performing an arbitration operation to determine whether the output of the speaker independent speech recognition operation or the output of the speaker dependent speech recognition operation should be used when there is a conflict between the output of the two speech recognition operations.

6. A method of providing a telephone service in response to a caller's speech, the method comprising the steps of;

identifying the caller;

performing, in parallel,
- i. a speech recognition operation on the speech to identify an explicit command in the speech;
- ii. a speaker dependent speech recognition operation on the speech to identify a word, other than an explicit command, in the speech; and performing an action in as a function of the outcome of the speech recognition operations performed in parallel.

7. The method of claim 6, wherein the word is a name; and wherein the step of performing an action includes the step of:

dialing a telephone number associated with the name.

8. The method of claim 6, further comprising the steps of:

detecting a first speech time interval to which an identified explicit command corresponds;

detecting a second speech time interval to which an identified word corresponds; and if there is a substantial overlap between the first and second time intervals, performing an arbitration operation to determine whether to respond to the detected command or to take some other action.

9. The method of claim 8, wherein a substantial overlap between the first and second time intervals exists when the first and second time intervals overlap by 50% or more.

10. A device for responding to speech, comprising:

means for performing speaker independent speech recognition on the speech to detect the presence of a spoken command in the speech;

means for performing speaker dependent speech recognition on the speech to detect a non-command word in the speech, the speaker independent and speaker dependent speech recognition means operating in parallel; and a device for performing an action in response to the detection of a command by the speaker independent speech recognition means.

11. The device of claim 10, further comprising:

an arbiter coupled to the speaker independent and speaker dependent speech recognition means, the arbiter for determining the action to be taken in response to the detection of a spoken command by the speaker independent speech recognition means and a non-command word by the speaker dependent speech recognition means.

12. The device of claim 11, further comprising a voice verification circuit coupled to the arbiter for selectively performing voice verification on the speech.

13. The device of claim 12, further comprising:

a database coupled to the speaker dependent speech recognition means, the database including a plurality of speaker dependent speech recognition templates and telephone numbers, a telephone number being associated with each speaker dependent speech recognition template.

14. The device of claim 13, further comprising:

a telephone for receiving the speech from a caller;

a switch for coupling the telephone to the speaker independent and speaker dependent speech recognition means.

* * * * *